United States Patent [19]

Yamasaki

[11] Patent Number: 4,508,962

[45] Date of Patent: Apr. 2, 1985

[54] READ FORMAT PRESET IN AN ELECTRONIC CASH REGISTER

[75] Inventor: Hitoshi Yamasaki, Nara, Japan

[73] Assignee: Sharp Kabushiki Kaisha, Osaka, Japan

[21] Appl. No.: 629,732

[22] Filed: Jul. 9, 1984

Related U.S. Application Data

[63] Continuation of Ser. No. 285,638, Jul. 21, 1981, abandoned.

[30] Foreign Application Priority Data

Jul. 30, 1980 [JP] Japan .................... 55-105737

[51] Int. Cl.³ .................................. G06K 15/00
[52] U.S. Cl. .................................. 235/378; 364/405; 235/383; 235/432; 235/419; 235/3
[58] Field of Search ............. 235/7 A, 7 R, 6, 5, 235/432, 383, 378, 2, 3; 364/403, 404, 405; 377/8

[56] References Cited

U.S. PATENT DOCUMENTS

| | | |
|---|---|---|
| 3,947,660 | 3/1976 | Saito .................................. 235/383 |
| 4,180,206 | 12/1979 | Takahashi et al. ................. 235/419 |
| 4,276,598 | 6/1981 | Inoue et al. ....................... 364/405 |
| 4,323,770 | 4/1982 | Dieulot et al. .................... 235/375 |
| 4,360,872 | 11/1982 | Suzuki et al. ..................... 364/405 |

FOREIGN PATENT DOCUMENTS

| | | | |
|---|---|---|---|
| 1115489 | 10/1961 | Fed. Rep. of Germany ...... 235/432 |
| 2731747 | 1/1979 | Fed. Rep. of Germany ...... 364/405 |
| 23537 | 3/1978 | Japan ................................. 364/405 |
| 80937 | 7/1978 | Japan ................................. 364/405 |

Primary Examiner—Thomas W. Brown
Assistant Examiner—Robert Lev
Attorney, Agent, or Firm—Birch, Stewart, Kolasch & Birch

[57] ABSTRACT

An electronic cash register can operate in a read out mode wherein the transaction data stored in the electronic cash register is read out for administration checking purposes. A programming system is provided for programming printout format in the read out mode in a desired fashion. Since the read out printout is conducted in accordance with the programmed format, only desired transaction data is printed out in the read out mode by desirably programming the printout format.

6 Claims, 3 Drawing Figures

READ FORMAT PRESET IN AN ELECTRONIC CASH REGISTER

This application is a continuation of application Ser. No. 285,638 filed on July 21, 1981, now abandoned.

BACKGROUND AND SUMMARY OF THE INVENTION

The present invention relates to an electronic cash register and, more particularly, to a read out system for printing out the accumulated transaction data for checking purposes.

An electronic cash register has been developed which can operate in a read out mode, wherein the registered transaction data is printed out for administration check purposes. In such an electronic cash register, the normal registration operation is conducted by inputting the unit cost data, the quantity data and the department data through the use of the numeral keys and the function keys including department keys. The thus introduced transaction data is stored in a memory system. When the stored transaction data is desired to be read out for administration check purposes, the electronic cash register is placed in the read out mode.

In the conventional electronic cash register, the read out format is fixed as shown in the following TABLE I. More specifically, the read out format is determined by the manufacturer, and the transaction data is printed out in accordance with the fixed read out format. Of course, the print out format in the normal registration operation mode is also fixed as shown in the following TABLE II.

TABLE I

| STEP | READ OUT MODE OPERATION |
| --- | --- |
| A-1 | stamp the store name on a receipt slip |
| A-2 | print the date information |
| A-3 | print a symbol "X" which indicates the read out mode |
| A-4 | space one line |
| A-5 | print out data regarding "department 1, quantity" |
| A-6 | print out data regarding "department 1, price" |
| A-7 | (repeat the steps A-5 and A-6 by the |
| A-8 | number of the department assigned) |
| A-9 | print out data regarding "department N, quantity" |
| A-10 | print out data regarding "department N, price" |
| A-11 | print out grand total total data |
| A-12 | print out data regarding "returned commodity, quantity" |
| A-13 | print out data regarding "returned commodity, price" |
| A-14 | (variable depending on the models) |
| A-15 | (variable depending on the models) |
| A-16 | print out data regarding "clerk A, quantity" |
| A-17 | print out data regarding "clerk A, price" |
| A-18 | (repeat the steps A-16 and A-17 by the number of clerks applicable) |
| A-19 | print out data regarding "clerk M, quantity" |
| A-20 | print out data regarding "clerk M, price" |
| A-21 | print out the receipt serial number and the machine number |

TABLE II

| STEP | REGISTRATION MODE OPERATION |
| --- | --- |
| B-1 | print out quantity Q |
| B-2 | print out price |
| B-3 | print out data regarding "department 1, tax, total amount" |
| B-4 | print out data regarding "department 1, total amount" |
| B-5 | print out data regarding "department 2, tax, refund" |
| B-6 | print out data regarding "department 2, refund" |
| B-7 | print out data regarding "department 3, tax, correction" |
| B-8 | print out data regarding "department 3, correction" |
| B-9 | print out data regarding "department 2, tax, total amount" |
| B-10 | print out data regarding "department 3, tax, total amount" |

However, the transaction data required for the administration purposes is quite different depending upon the type of store. Further, if the print out format in the read out mode is fixed, it takes a considerably long period of time to obtain desired data even when the desired data relates to a small number of items.

Accordingly, an object of the present invention is to provide a novel read out system in an electronic cash register.

Another object of the present invention is to provide a program system for presetting a desired format in reading out the transaction data stored in an electronic cash register.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a mode selection switching means is provided for selectively placing an electronic cash register in the normal registration mode, the read out mode, and the preset mode wherein the read out format is preset. In the normal registration mode, the transaction data is registered into the electronic cash register through the use of a keyboard panel including numeral keys and function keys. When the electronic cash register is placed in the present mode, the keyboard panel is used to introduce command data for programming the read out format in the read out operation. The thus programmed read out format is stored in a program memory. Thereafter, when the electronic cash register is placed in the read out mode, the programmed format stored in the program memory is read out for printing out the transaction data stored in the electronic cash register in accordance with the programmed read out format.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
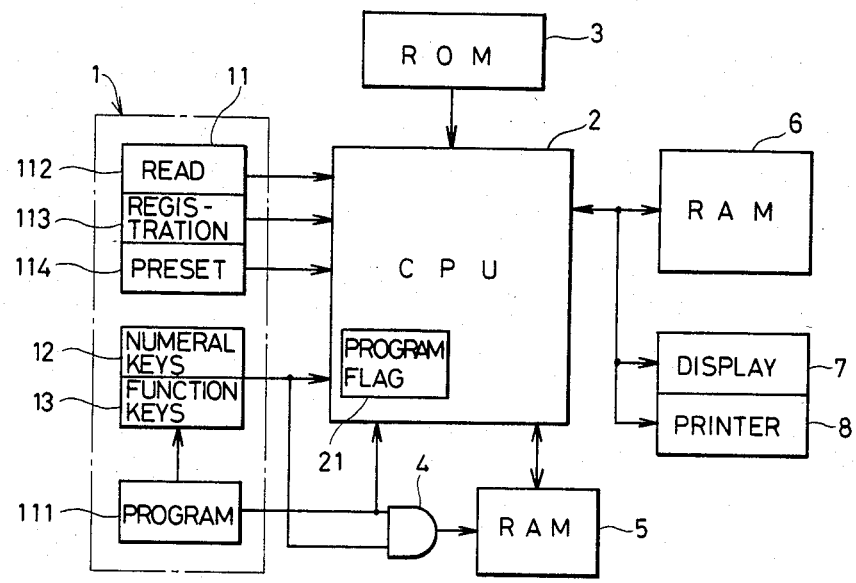
FIG. 1 is a schematic block diagram of an embodiment of an electronic cash register of the present invention.
Figure 2:
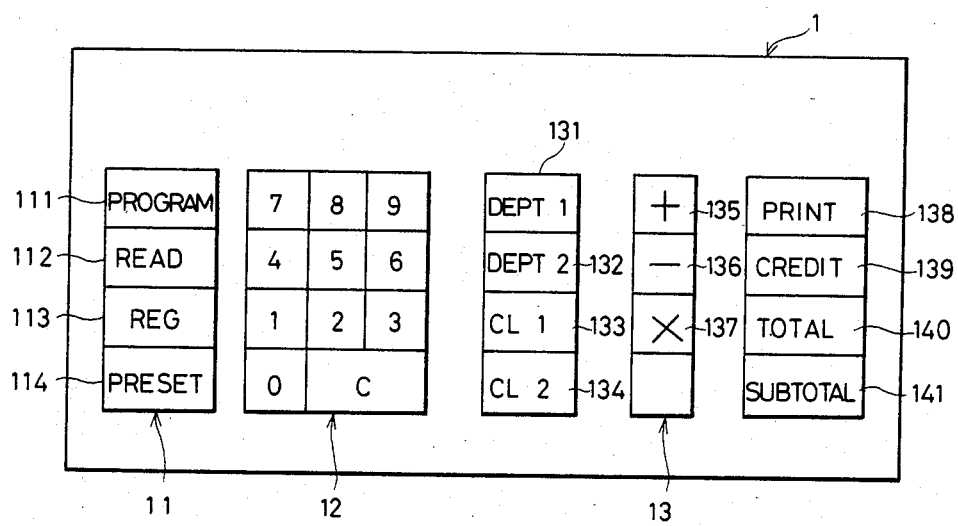
FIG. 2 is a plan view of a keyboard panel included in the electronic cash register of FIG. 1.

An electronic cash register of the present invention includes a keyboard panel 1, a central processor unit 2, a read only memory 3 for storing programmed orders for controlling the operation of the electronic cash register, a first random access memory 5 for storing a programmed read out format which is preset through the keyboard panel 1, and a second random access memory 6 for storing the transaction data registered through the keyboard panel 1. The central processor unit 2 is preferably made of a microprocessor "Z-80" manufactured by Sharp Kabushiki Kaisha. The read only memory 3 is preferably made of a programmable ROM "M-2732" manufactured by Mitsubishi Denki Kabushiki Kaisha. The electronic cash register of the present invention further includes a digital display system 7, a print unit 8 and an AND gate 4.

The keyboard panel 1 includes a mode selection switch panel 11, numeral keys 12 and function keys 13. The mode selection switch panel 11 includes a program set key 111, a read out mode key 112 for placing the electronic cash register in the read out mode wherein the registered transaction data is printed out for administration check purposes, a registration mode key 113 for placing the electronic cash register in the normal registration mode, and a preset mode key 114 for placing the electronic cash register in the preset mode. When the program set key 111 is actuated in the preset mode, the electronic cash register is placed in the program preset mode wherein the printout format in the read out mode is programmable in a desired fashion.

The function keys 13 include a "department 1" key 131, a "department 2" key 132, a "clear 1" key 133, a "clear 2" key 134, a "+" key 135, a "−" key 136, a "X" key 137, a "print" key 138, a "credit" key 139, a "total" key 140 and a "subtotal" key 141. These function keys and the numeral keys 12 are used to register the transaction data in the normal registration mode, and to develop a command signal for programming the printout format in the read out mode when the electronic cash register is placed in the program preset mode. The command signal corresponding to each of the function keys 13 is listed in the following TABLE III.

TABLE III

| KEY | COMMAND SIGNAL COMMAND |
|---|---|
| DEPT 1 | select the random access memory 5 (DEPT 1 key is associated with numeral keys 12 for developing a desired step instruction listed in the TABLE I) |
| DEPT 2 | select the random access memory 6 (DEPT 2 key is associated with the numeral keys 12 for developing a desired step instruction listed in the TABLE II) |
| PRINT | print |
| CREDIT | limit the digit number (CREDIT key is associated with the numeral keys 12 for limiting the digit number) |

TABLE III-continued

| KEY | COMMAND SIGNAL COMMAND |
|---|---|
| TOTAL | end (program end) |
| SUBTOTAL | key identification (SUBTOTAL KEY is associated with the numeral keys 12 so that the read out operation is conducted only when a specific numeral key is actuated in the read out mode) |
| + | addition |
| − | subtraction |
| × | multiplication |
| CL 1 | unconditional jump |
| CL 2 | conditional jump when $x \geq 0$ |

A key input signal derived from the keyboard panel 1 is introduced into the central processor unit 2. Further, the key input signal derived from the numeral keys 12 and the function keys 13 is applied to one input terminal of the AND gate 4. The other input terminal of the AND gate 4 is connected to receive a mode signal developed from the program set key 111. Therefore, the AND gate 4 is conductive in the program preset mode, thereby applying the key input signal derived from the numeral keys 12 and the function keys 13 to the random access memory 5 in the program preset mode.

The operations in the normal registration mode and the read out mode are similar to those conducted in the conventional electronic cash register. The feature of the present invention resides in the program preset mode wherein the read out format is preset in the random access memory 5 through the use of the numeral keys 12 and the function keys 13.

The following TABLE IV and TABLE V show examples of the programmed print format which will be produced in the read out mode. In the following tables, steps A-n represents the steps listed in the TABLE I, each of which is identified by the combined actuation of the "department 1" key 131 and a desired numeral key included in the numeral keys 12. Step B-n represents the step listed in the TABLE II, which is identified by the combined actuation of the "department 2" key 132 and a desired numeral key included in the numeral keys 12.

TABLE IV

| PROGRAMMED STEP | PRINTOUT FORMAT PROGRAM OPERATION |
|---|---|
| A-1 | stamp the store name on a receipt slip |
| A-4 | space one line |
| A-2 | print the date information |
| A-3 | print the symbol "X" |
| A-4 | space one line |
| A-16 | print out the stored data regarding "clerk A, quantity" |
| A-17 | print out the stored data regarding "clerk A, price" |
| A-4 | space one line |
| A-21 | print out the receipt serial number and the machine number |

TABLE V

| PROGRAMMED STEP | PRINTOUT FORMAT PROGRAM OPERATION |
|---|---|
| A-4 | space one line |
| A-2 | print the date information |
| A-4 | space one line |
| B-3 | print out the data stored in the |

TABLE V-continued

PRINTOUT FORMAT PROGRAM

| PROGRAMMED STEP | OPERATION |
|---|---|
| | random access memory 6 regarding "department 1, tax, total amount" |
| B-9 | print out the data stored in the random access memory 6 regarding "department 2, tax, total amount" |
| B-10 | print out the data stored in the random access memory 6 regarding "department 3, tax, total amount" |
| B-7 | print out the data stored in the random access memory 6 regarding "department 3, tax, correction" |
| A-4 | space one line |
| A-21 | print out the receipt serial number and the machine number |

Figure 3:
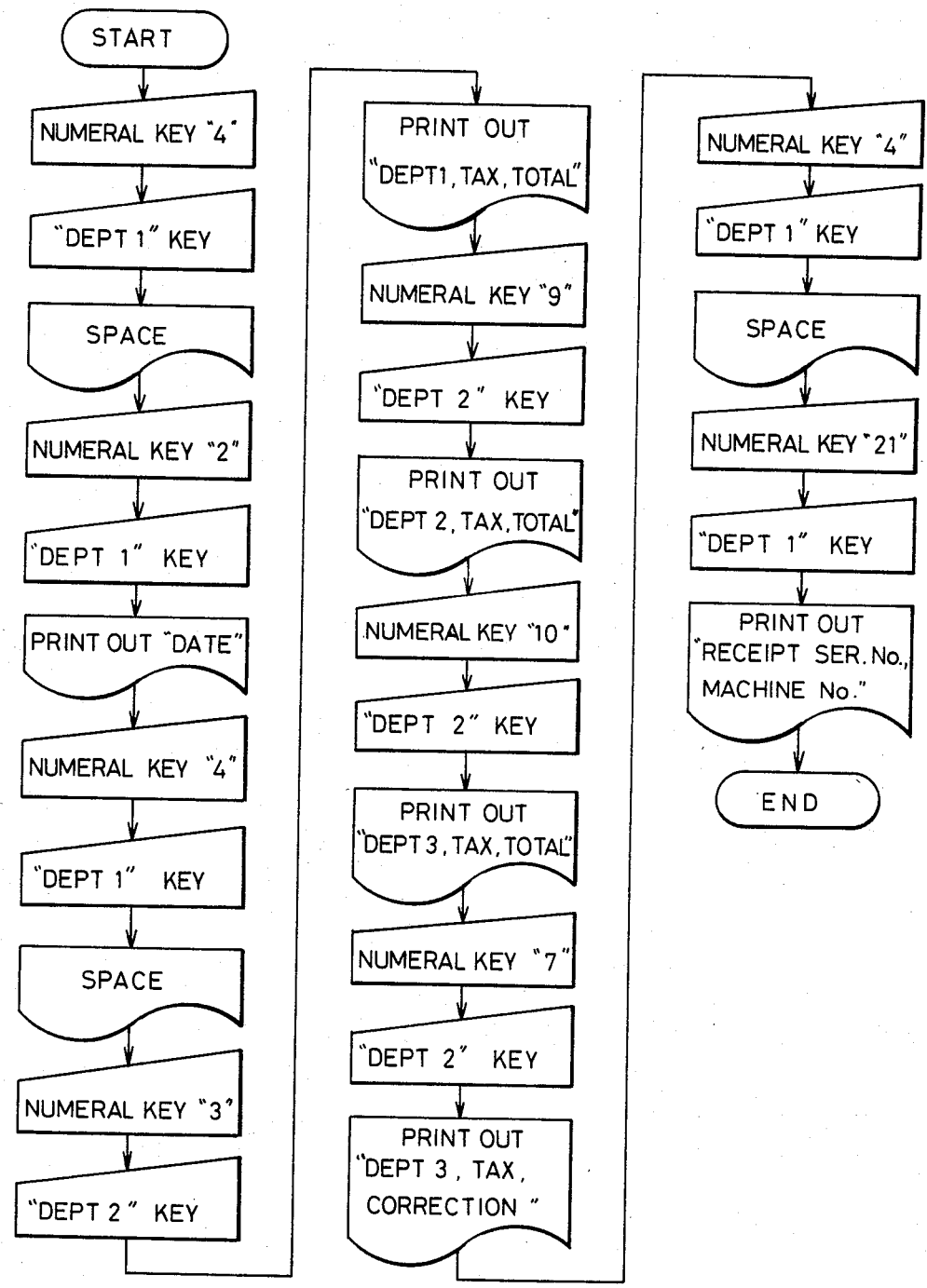
FIG. 3 is a flow chart for explaining a preset mode operation in the electronic cash register of FIG. 1.

The printout format program operation for presetting the print format shown in the TABLE V will be described with reference to a flow chart of FIG. 3.

First, the preset mode key 114 included in the mode selection switch panel 11 is actuated and the program set key 111 included in the mode selection switch panel 11 is actuated to place the electronic cash register in the program preset mode. In response to the actuation of the program set key 111, a program flag is set at a section 21 in the central processor unit 2. Further, the AND gate 4 is made conductive to introduce the program commands derived from the numeral keys 12 and the function keys 13 into the random access memory 5.

Then, the programming is conducted. The printout format shown in the TABLE V first requires the one line spacing. The numeral key "4" included in the numeral keys 12 is actuated and, then, the "department 1" key 131 included in the function keys 13 is actuated. The central processor unit 2 develops a control signal for storing the introduced command in the random access memory 5, and for conducting one line receipt feed toward the printer unit 8. Thus, the printer unit 8 actually feeds the receipt slip by one line.

Next step to be programmed is to print out the date information on the receipt slip. The numeral key "2" included in the numeral keys 12 and the "department 1" key 131 are successively actuated to introduce the command data for conducting the date information print out. The thus introduced command data is stored in the random access memory 5. Further, the central processor unit 2 functions to apply the date information stored in the random access memory 6 to the printer unit 8 for printing out the date information on the second line of the receipt slip.

The numeral key "4" included in the numeral keys 12 and the "department 1" key 131 included in the function keys 13 are successively actuated to introduce the command data for conducting one line spacing into the random access memory 5. In response to the thus introduced command data, the central processor unit 2 drives the printer unit 8 to feed the receipt slip by one line.

The fourth line of the read out printout is required to be the transaction data regarding the department 1, tax and the total amount registered in connection with the department 1. The numeral key "3" included in the numeral keys 12 and the "department 2" key 132 included in the function keys 13 are successively actuated to introduce the command data B-3 into the random access memory 5. The central processor unit 2 functions to read out the transaction data stored in the random access memory 6 related to the department 1 tax and the total amount. The thus read out transaction data is applied to the printer unit 8 to print it out.

In order to print out the transaction data related to the department 2 tax and the total amount registered in connection with the department 2 on the fifth line of the receipt slip in the read out mode, the numeral key "9" and the "department 2" key 132 are actuated. The command data B-9 is introduced into and stored in the random access memory 5. Further, central processor unit 2 develops a control signal for printing out the transaction data related to the department 2, which has been stored in the random access memory 6.

The programming operation is conducted in this way to introduce the command data into the random access memory 5 in a desired order. When all of the command data listed in the TABLE V have been introduced through the numeral keys 12 and the function keys 13, the total key 140 is actuated to complete the programming.

The read out operation is conducted in accordance with the thus programmed printout format when the electronic cash register is placed in the read out mode through the use of the read out mode key 112.

In a preferred form, the print out operation in the read out mode is actually conducted only when a specific numeral key, for example, the numeral key "1" included in the numeral keys 12 is actuated after actuation of the read out mode key 112. To program this operation, after actuation of the total key 140 in the program preset mode, the numeral key "1" included in the numeral key 12 and the subtotal key 141 included in the function keys 13 are successively actuated to store the command data in the random access memory 5 for controlling the print out operation in the read out mode. By programming this command data, the data print out in the read out mode is conducted only when the numeral key "1" is actuated in the read out mode.

As discussed above, in the program preset mode, the central processor unit 2 develops a control signal for conducting the operation now programmed through the keyboard panel 1. Therefore, the operator can check whether the desired command data is introduced into and stored in the random access memory 5.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic cash register comprising:
 transaction data memory means for storing transaction data;
 mode selection means for selectively placing the electronic cash register in a normal registration mode, a read out mode or a program preset mode;
 keyboard panel means for introducing transaction data into said transaction data memory means in said normal registration mode, and for introducing program commands into the electronic cash register in said program preset mode, said program commands including variable print format instruction commands for determining a print format of the information printed out in said read out mode;
 print format memory means for storing said variable print format instruction commands introduced from said keyboard panel means in said program present mode;

read out means responsive to said print format memory means for reading out said transaction data stored in said transaction data memory means in accordance with said variable print format instruction commands stored in said print format memory means when the electronic cash register is placed in said read out mode; and printer means for printing out said transaction data read through said read out means in said read out mode.

2. The electronic cash register of claim 1, wherein said read out means is also operative in said program preset mode.

3. The electronic cash register of claim 1, wherein said keyboard panel means includes:

numeral keys; and function keys including department identifying keys, and wherein said variable print format commands being developed in response to a combined actuation of a desired numeral key included in said numeral keys and a desired department identifying key included in said function keys.

4. The electronic cash register of claim 2, wherein said keyboard panel means includes:

numeral keys; and function keys including department identifying keys, and wherein said variable print format commands being developed in response to a combined actuation of a desired numeral key included in said numeral keys and a desired department identifying key included in said function keys.

5. An electronic cash register comprising:

transaction data memory means for storing transaction data, said transaction data being stored therein as a plurality of different transaction information portions;

keyboard panel means for introducing transaction data into said transaction data memory means and for introducing variable print format commands representative of a desired format for printing out all or part of said plurality of different transaction information portions;

print format memory means for storing said variable print format commands introduced from said keyboard panel means;

read out means responsive to said print format memory means and the variable print format commands stored therein for reading out said transaction information portions in a desired order as directed by said variable print format commands;

printer means for printing out desired data; and printer drive means responsive to said print format memory means and the variable print format commands for developing the desired data for printing in a desired format by formatting said transaction information portions as directed by said variable print format commands.

6. The electronic cash register of claim 4 further comprising:

mode selection means for selectively placing the electronic cash register in a normal registration mode, a read out mode or a program preset mode;

said keyboard panel means introducing transaction data into said transaction data memory means when in said normal registration mode and for introducing said variable print format commands into said cash register when in said program preset mode;

said read out means and printer drive means being operable only in said read out mode.

* * * * *